N. W. McLEOD.
APPARATUS FOR MAKING CORD TIRE SKELETONS.
APPLICATION FILED DEC. 18, 1914.
1,250,916.
Patented Dec. 18, 1917.
2 SHEETS—SHEET 1.
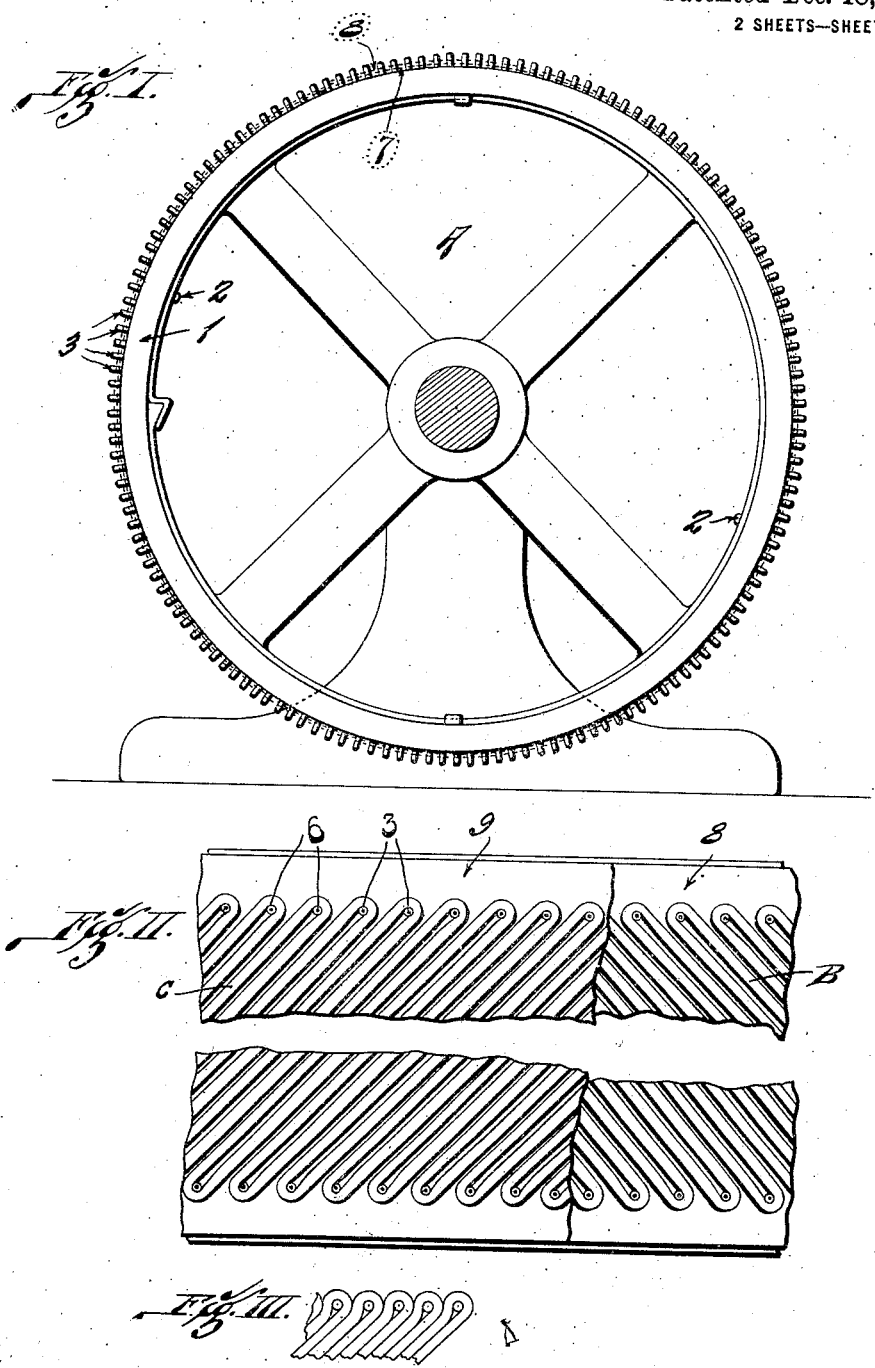

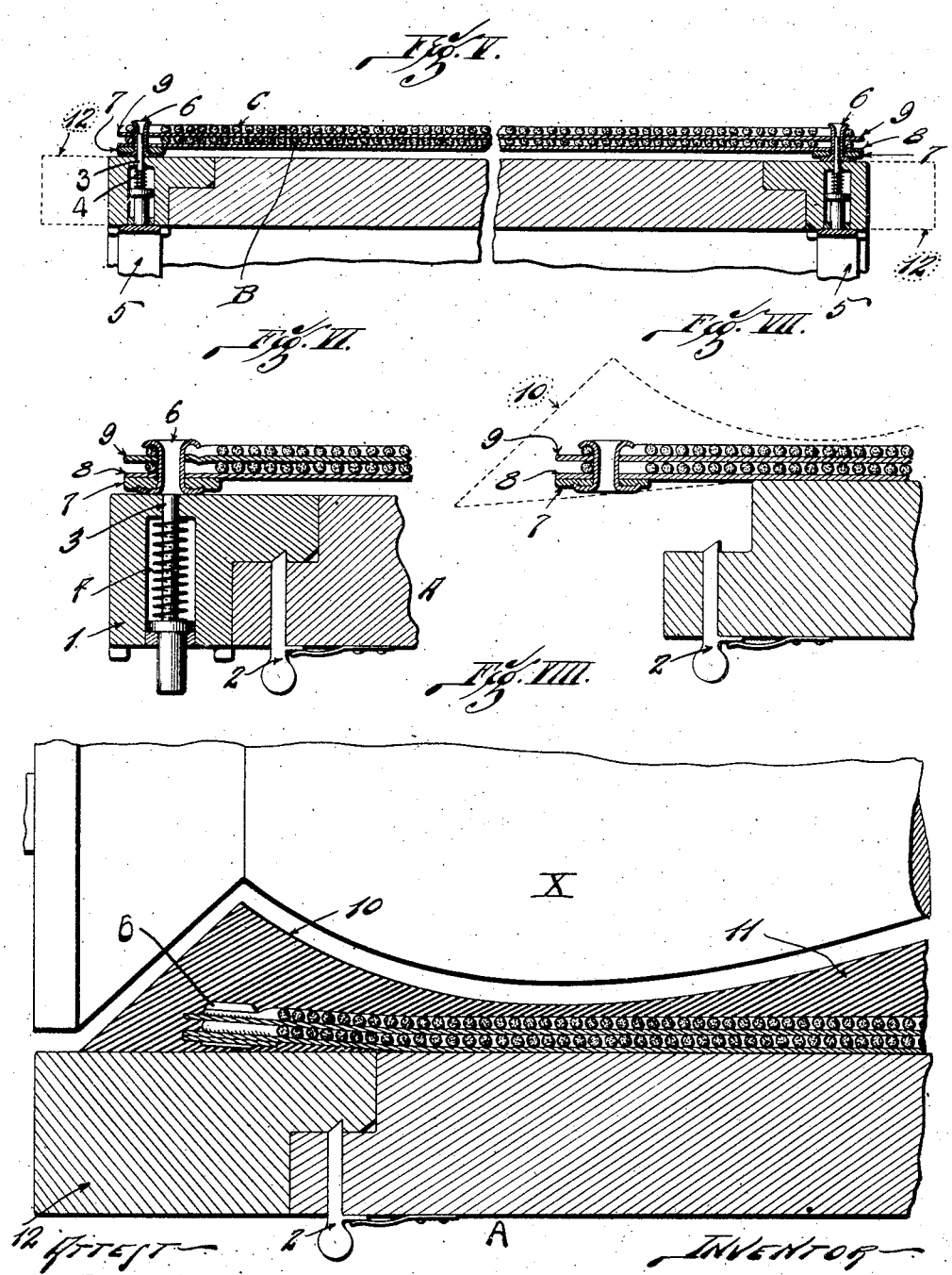

UNITED STATES PATENT OFFICE.

NELSON W. McLEOD, OF ST. LOUIS, MISSOURI, ASSIGNOR, BY MESNE ASSIGNMENTS, TO AMERICAN MOTORS TIRE COMPANY, OF DETROIT, MICHIGAN, A CORPORATION OF MICHIGAN.

APPARATUS FOR MAKING CORD-TIRE SKELETONS.

1,250,916.　　　　　Specification of Letters Patent.　　Patented Dec. 18, 1917.

Application filed December 18, 1914. Serial No. 877,910.

*To all whom it may concern:*

Be it known that I, NELSON W. McLEOD, a citizen of the United States of America, a resident of the city of St. Louis, State of Missouri, have invented certain new and useful Improvements in Apparatus for Making Cord-Tire Skeletons, of which the following is a full, clear, and exact description, reference being had to the accompanying drawings, forming a part of this specification.

My invention relates to improvements in the art of making tires, and more specifically stated to an apparatus for use in the manufacture of cord tire skeletons. One of the objects of the invention is to produce an improved means for holding the cord elements during the process of manufacturing such skeleton.

Another object is to produce a cord holding device having rows of supporting elements adapted to extend through the margins of a cord web which is substantially flat in cross-section, the supporting elements being so arranged that the web may be produced by winding cord diagonally across the support, in substantially straight lines; instead of by winding the cord in arcuate paths around a mandrel conforming to the shape of a tire.

The invention also comprises details of construction including cord holding elements detachably secured to a support and tire forming elements adapted to be substituted for said cord holding elements.

Figure I is a side elevation of a device embodying the features of my invention for making cord ribbons.

Fig. II is an enlarged fragmentary view illustrating oppositely inclined cord elements wound onto the periphery of the device shown in Fig. I.

Fig. III is a detail view illustrating slight modification.

Fig. IV is a diagrammatical view of the cord windings shown in Fig. II.

Fig. V is an enlarged transverse section showing the ribbon produced by winding cord onto the annular support shown in Fig. I.

Fig. VI is an enlarged fragmentary cross-section showing a marginal portion of the support and a marginal portion of the web as it appears when the cords are riveted to a connecting ring.

Fig. VII is a view similar to Fig. VI, the cord holding ring being removed from the support.

Fig. VIII is an enlarged fragmentary cross-section showing one of the tire forming rings attached to the margin of the annular support, and also showing a tire forming roller for shaping the tire structure on the annular support.

In the accompanying drawings, which illustrate my invention in its preferred form, A designates a rotatable annular support or mandrel, and 1 designates cord holding rings detachably secured to the margins of said annular support. 2 designates yieldable latch members for securing the cord holding rings 1 to the annular support. Cord holding pins 3, slidably fitted to the cord holding rings 1, are adapted to project from the periphery of said rings, as shown in Figs. I, II and V. Springs 4 tend to move the cord holding pins to their inoperative position, shown in Fig. VI. Each cord holding ring 1 is provided with a circular row of cord holding pins 3, and all of these pins may be retained in their operative positions by expansible rings 5 fitted to the inner faces of the cord holding rings and engaging the inner ends of the cord holding pins, as shown in Figs. I and V.

Before winding the cord onto the supporting elements, tubular rivets 6 are placed over the projecting portions of the cord holding pins 3, and these rivets are preferably connected by means of rings 7 made of vulcanized rubber or any other suitable material. A sheet of raw rubber 8 is preferably placed over the outer ends of the rivets 6 and seated on the connecting rings 7. The inner cord ply B is preferably formed by winding cord partially around the rivets 6 to produce a zig-zag winding consisting of cord elements, each of which lies at an oblique angle to the side edges of the fabric layer. Owing to the location of the circular rows of pins 3, and since said rows are substantially equal in diameter, a web substantially flat or straight in cross-section may be formed on the support by winding cord diagonally across the support in substantially straight lines. A sheet of raw rubber 9 is preferably placed over the cord ply B and the outer cord ply C is then wound onto the rivets 6, so that its cord elements cross and lie at an angle to the cord elements of the cord ply B, Any suitable winding mechanism may be utilized in winding the cord onto the rivets and the completed structure may include any desired number of plies. Upon the completion of the winding operations the pins 3 are withdrawn from the rivets 6 and the outer ends of said rivets are upset to securely connect the ends of the cord elements to the connecting rings 7. The cord holding pins 3 may be readily withdrawn from the rivets 6 by removing or contracting the expansible rings 5, thus permitting the springs 4 to shift said pins 3 to their inoperative positions (shown in Fig. VI). It will be noted that each individual cord element may be firmly secured to the connecting rings 7 by the rivets 6, so that each cord element is a unit securely held at its ends, and although the different cord elements may be formed of a single cord, the different units are so secured that one or more of them may be ruptured or otherwise impaired without releasing any of the remaining cord units.

Fig. V shows that the web produced in carrying out my method may be substantially flat or straight in cross-section, and it will be apparent that a web of this kind may be readily formed by winding cord onto the rivets 6 which project from the periphery of the annular support.

After the rivets have been upset to secure the cord elements to the connecting members 7, the cord holding rings 1 are detached from the annular support A, and tire beads 10 are then roughly formed at the free side margins of the fabric, see Fig. VII. Raw rubber 11 is applied to the ribbon for the production of the tread of the tire, and tire forming rings 12 are secured to the margins of the annular support, as shown by dotted lines in Fig. V, and full lines Fig. VIII. These tire forming rings may be secured by the latch members 2 which also serve as means for attaching the cord holding rings to the annular support. The raw tire structure arranged on the annular support, is preferably shaped by means of a roller X (Fig. VIII) and after this operation, it is removed, shaped to the configuration of a finished tire, and vulcanized.

I claim:—

1. A cord structure making apparatus comprising, a support, a row of cord holding members fitted to said support, said cord holding members being movable to release the cord structure from said support, and means for operating said cord holding members.

2. A cord structure making apparatus comprising, a support, a row of cord holding members fitted to said support, said cord holding members being movable to release the cord structure from said support, and means for operating said cord holding members, said means including springs tending to move said cord holding members in one direction.

3. A cord structure making apparatus comprising, a support, a row of cord holding members fitted to said support, said cord holding members being movable to release the cord structure from said support, and means for operating said cord holding members, said means including a ring for moving said cord holding members in one direction.

4. A cord structure making apparatus comprising, an annular support, a row of cord holding members movably fitted to said support, and a ring for operating said cord holding members.

5. A cord structure making apparatus comprising, an annular support, a row of cord holding members fitted to said support, said cord holding members being adapted to project into elements of the cord structure to secure them to the support while the cord is being wound, and the said cord holding members being movable to release the cord structure from said support, and a ring for operating said cord holders.

6. A cord structure making apparatus comprising, a support provided with cord holding members arranged in circular rows which are substantially equal in diameter, the cord holding members being movable relative to said support and means for operating said cord holding members.

7. A cord structure making apparatus comprising, a support provided with a row of rivet holders adapted to receive elements of the cord structure, and means for shifting said holders to release them from the cord structure.

8. A cord structure making apparatus comprising, an annular support provided with a row of rivet holders adapted to receive the elements of the cord structure, and means for shifting said holders to release them from the cord structure.

9. The cord structure making apparatus comprising, a support provided with a row of rivet holding pins adapted to hold rivets onto which the fabric is wound, and means for shifting said pins to withdraw them from the rivets, thereby releasing the cord structure from said support.

10. A cord structure making apparatus comprising, a support provided with two rows of rivet holding pins adapted to secure the margins of the cord structure, and means for withdrawing said pins from the cord structure to release said structure from said support.

11. A cord structure making apparatus comprising, an annular support provided with a row of substantially radial cord holding pins which project from the periphery of said support and which are adapted to secure the cord elements, and means for withdrawing said cord holding pins to release the cord structure from said support.

12. A cord structure making apparatus comprising, an annular support provided with rows of substantially radial cord holding pins which are movably fitted to said support, and means for moving said cord holding pins toward the axis of said annular support to release the cord structure from said support.

13. A cord structure making apparatus comprising, an annular support provided with two annular rows of cord holding members adapted to project from said support, and means for moving said cord holding members toward the axis of said annular support to release the cord structure therefrom.

14. A cord structure making apparatus comprising, an annular support, an annular row of cord holding members fitted to said support, an expansible ring for holding said cord holding members in their operative positions, and springs tending to move said cord holding members to their inoperative positions.

15. A cord structure making apparatus comprising, an annular support, cord holding rings detachably secured to said support, and cord holding pins projecting from said cord holding rings.

16. A cord structure making apparatus comprising, an annular support, cord holding rings detachably secured to said support, and cord holding pins projecting from said cord holding rings, said cord holding pins being movable toward and away from the axis of said annular support.

17. A cord structure making apparatus comprising, a support, cord holding members detachably secured to said support, and tire forming members adapted to be substituted for said cord holding members.

NELSON W. McLEOD.

In the presence of:—
  A. J. McCauley,
  E. K. Clark.